(12) United States Patent
Anderson et al.

(10) Patent No.: US 12,722,431 B2
(45) Date of Patent: Sep. 1, 2026

(54) SINGLE MOTION SYSTEM FOR COUPLING A TRAILER HITCH

(71) Applicant: Progress Mfg. LLC, Provo, UT (US)

(72) Inventors: Jed K. Anderson, Lindon, UT (US); David F. Lundgreen, Spanish Fork, UT (US); Jason R. Harper, Spanish Fork, UT (US)

(73) Assignee: Dexter Axle Company LLC, Elkhart, IN (US)

( * ) Notice: Subject to any disclaimer, the term of this patent is extended or adjusted under 35 U.S.C. 154(b) by 446 days.

(21) Appl. No.: 18/344,687

(22) Filed: Jun. 29, 2023

(65) Prior Publication Data

US 2025/0001817 A1 Jan. 2, 2025

(51) Int. Cl.
*B60D 1/06* (2006.01)

(52) U.S. Cl.
CPC ............... *B60D 1/065* (2013.01); *B60D 1/06* (2013.01)

(58) Field of Classification Search
CPC ................................. B60D 1/06; B60D 1/065
See application file for complete search history.

(56) References Cited

U.S. PATENT DOCUMENTS 5,482,309 A * 1/1996 Hollis .................... B60D 1/583 280/901
6,540,246 B2 4/2003 Andersen et al.
6,880,368 B1 * 4/2005 Ulbrich .................... B60D 1/06 280/425.2
7,378,013 B2 * 5/2008 Sandler .................... B60D 1/28 280/514
7,926,832 B1 * 4/2011 Hall ....................... B60D 1/065 280/441.2
8,523,217 B2 9/2013 Andersen
9,132,707 B2 * 9/2015 LaPrade ................. B60D 1/363
2003/0047908 A1 * 3/2003 Lara ....................... B60D 1/065 280/441.2
2013/0334793 A1 * 12/2013 LaPrade ................. B60D 1/363 280/507

* cited by examiner

*Primary Examiner* — Kevin Hurley
(74) *Attorney, Agent, or Firm* — McGarry Bair PC

(57) ABSTRACT

A trailer hitch including a tube having ball socket, a top plate connected to the tube, where the top plate includes an opening designed and configured to receive a hitch ball. The trailer hitch also includes a lower plate, where the top plate includes an opening designed and configured to receive a hitch ball, and where the lower plate is connected to the top plate via first and second sidewalls, and the top plate, lower plate and first and second sidewalls form a space. The trailer hitch further includes a slide plate positioned within the space and configured to slide between the top plate and lower plate, where the top plate includes an opening designed and configured to receive a hitch ball, and the slide plate may be configured to move between an open position and a closed position, where the open position enables a hitch ball to pass through the opening of the slide plate and the closed position prevents a hitch ball from passing through the opening in the slide plate.

19 Claims, 15 Drawing Sheets

SINGLE MOTION SYSTEM FOR COUPLING A TRAILER HITCH

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

1. The Field of the Present Disclosure

The present disclosure relates generally to trailer hitch coupling systems, including gooseneck trailer hitch systems and other hitch ball. More particularly, but not necessarily entirely, the disclosed embodiments relate to locking and unlocking trailer hitch systems.

2. Description of Related Art

It is common practice to use gooseneck trailer hitch to couple to a hitch ball fixed to the bed of a truck or other tow vehicle, systems. Many conventional trailer hitch systems have tried to use a locking mechanism to secure a hitch ball in coupling engagement with a trailer hitch by using pivoting or rotating locking plates or arms. There are various hitches that attempt to pivot a locking mechanism under a hitch ball to keep the hitch ball from disengaging from a ball socket of the hitch. Other hitches utilize sliding pins that may secure the hitch ball into engagement with a ball socket, while still others attempt to use a pivoting, or rotating, pin or sliding member, but these pins or sliding members typically only engage a single side of the hitch ball, leaving the locked connection of the hitch ball with the trailer hitch less stable and secure.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims. Any discussion of documents, acts, materials, devices, articles or the like which has been included in the present specification is not to be taken as an admission that any or all of these matters form part of the prior art base, or were common general knowledge in the field relevant to the present disclosure as it existed before the priority date of each claim of this application.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
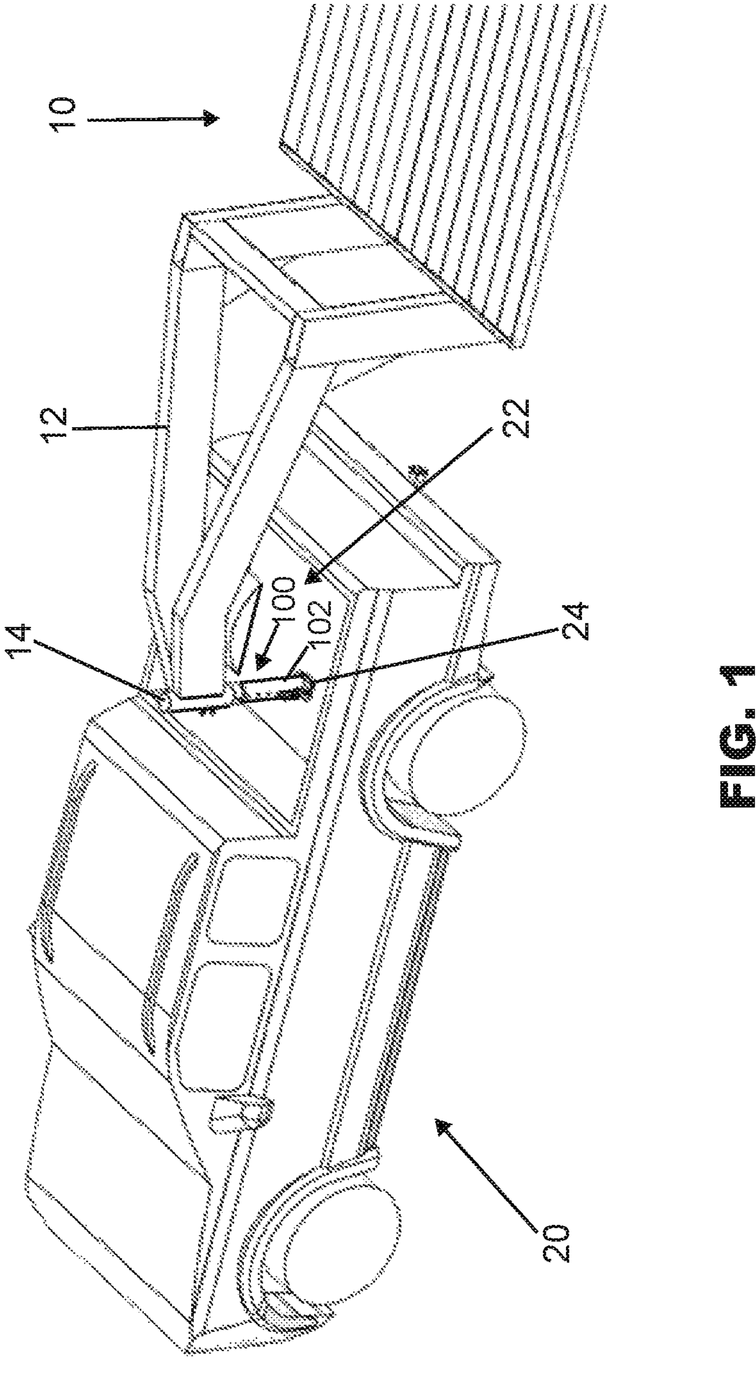
FIG. 1 is a perspective view a trailer hitch system, in accordance with the principles of the present disclosure.
Figure 2:
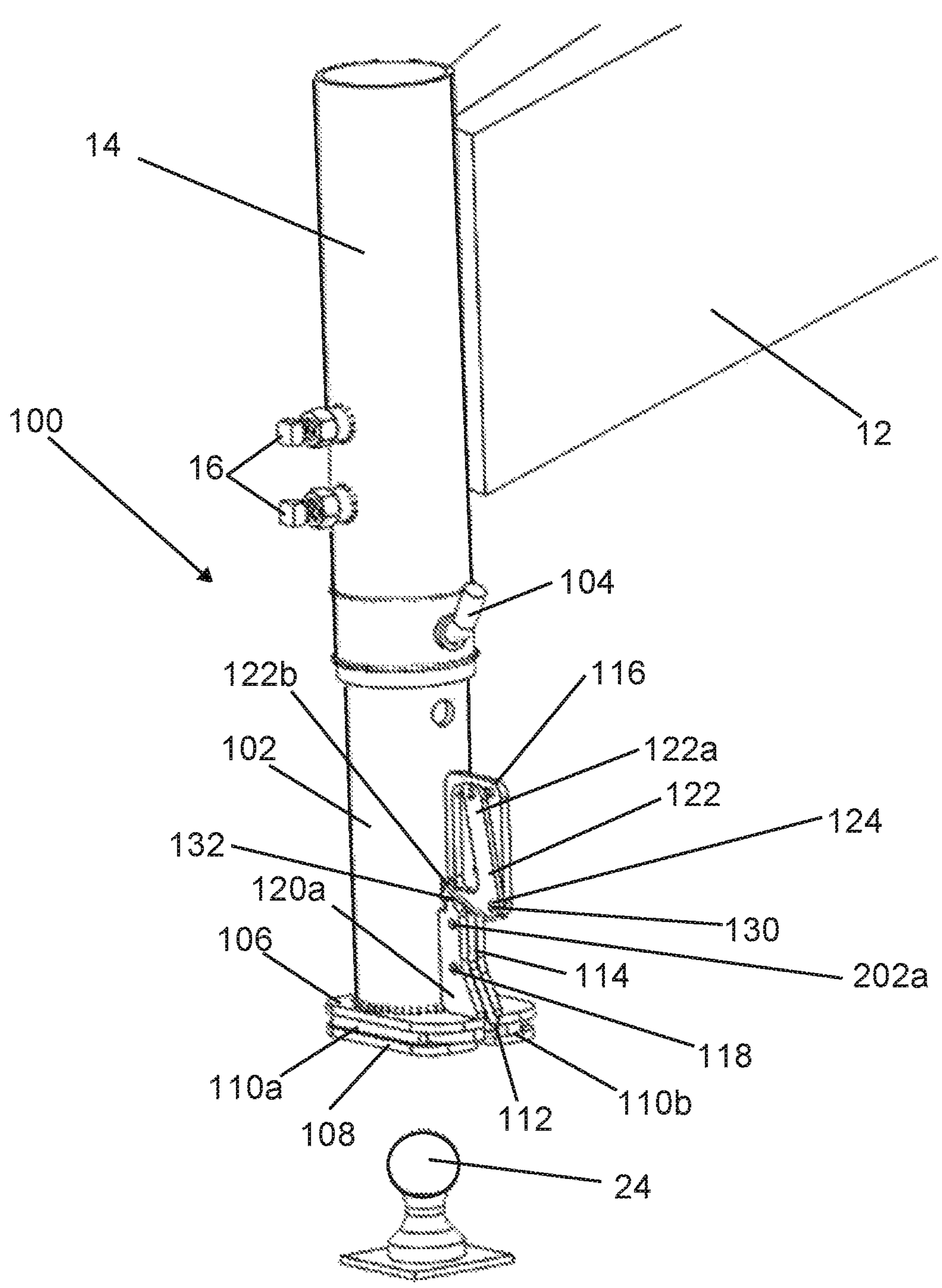
FIG. 2 is a zoomed in view of the trailer hitch system of FIG. 1.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise.

In describing and claiming the present disclosure, the following terminology will be used in accordance with the definitions set out below.

As used herein, the terms "comprising," "including," "containing," "characterized by," and grammatical equivalents thereof are inclusive or open-ended terms that do not exclude additional, uncredited elements or method steps.

As used herein, the phrase "consisting of" and grammatical equivalents thereof exclude any element, step, or feature not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

As used herein, the phrase "single motion" and grammatical equivalents may be defined by, moving on object in a single imaginary plane in a single continuous motion without stopping or interrupting the motion or changing direction.

As used herein, the phrase "open position" and grammatical equivalents may be defined by, a hitch that is configured and positioned to receive a hitch ball. The "open position" may also refer to the position of all moveable components or elements of the hitch that are configured and positioned to allow the hitch to receive a hitch ball.

As used herein, the phrase "closed position" and grammatical equivalents may be defined by, a hitch that is configured and positioned to secured a hitch ball in a coupled position with the hitch. The "closed position" may also refer to the position of all moveable components or elements of the hitch that are configured and positioned to allow the hitch to secured a hitch ball in a coupled position with the hitch.

Applicant has discovered a system and method of coupling a trailer hitch to a ball hitch of a tow vehicle using a single motion to open or unlock the hitch and a single motion to lock or close the hitch.

Referring now to FIG. 1, a trailer hitch 100 of the current disclosure is shown in use, coupling a trailer 10 to a tow vehicle 20. The trailer 10 includes a tongue 12 that may extend over at least a portion of the tow vehicle 20. The tongue 12 may extend over a bed 22 or back end of the tow vehicle 20 to engage with or couple to a hitch ball 24 fixed thereto. The disclosed tongue 12 may also be a gooseneck tongue 12 such that it extends over the top of the tow vehicle bed 22 and the trailer hitch 100 may extend downward from the tongue 12 to engage and couple with the hitch ball 24.

Referring to FIGS. 2-8, an outer tube 14 may be coupled or fixed to the trailer tongue 12. The outer tube 14 may be removably coupled to the tongue 12 using bolts 16, or the other desired fasteners. The outer tube 14 may also be welded to the tongue 12 or fixed thereto using any other desired fixing mechanism.

The outer tube 14 may be designed and configured to receive an inner tube 102 which may have substantially the same basic shape as the outer tube 14, such as a substantially circular cross-section, however the diameter of inner tube 102 may be less than the diameter of the outer tube 14, such that the inner tube may be received into a hollow inner cavity of the outer tube 14. Although FIGS. 2-8 disclose the outer tube 14 and the inner tube 102 having substantially circular cross-sections, the cross-sections of the inner tube 102 and outer tube 14 may have any desired shape, as long as a first end or first portion of the inner tube 102 can be received within the outer tube 14. Once the inner tube is received within the interior cavity of the outer tube 14, a latch pin 104 may be inserted into corresponding holes in the outer tube 14 and the inner tube 102 such that the outer tube 14 will no longer translate or move positions independent of the inner tube 102, coupling the outer tube 14 to the inner tube 102.

On an end portion, or terminal end, of the inner tube 102 a top plate 106 may be fixed to the inner tube 102. The top plate 106 may form a flange or surface that extends away from the inner tube 102, such that the top plate 106 may form a substantially right angle with an outer surface of the inner tube 102. A lower plate 108 may have substantially the same shape as the top plate 106 and may be fixed to the top plate 106 via sidewalls 110*a* and 110*b*. Sidewalls 110*a* and 110*b* may extend between the top plate 106 and the lower plate 108 and run along corresponding sides of the top plate 106 and the lower plate 108, such that a space or cavity may be formed between the top plate 106, the sidewalls 110*a* and 110*b* and the lower plate 108. The sidewalls 110*a* and 110*b* can be fixed to the top plate 106 and the lower plate 108 using any desired fastening mechanism, for example, welding, adhesive, bolts or other fasteners. The top plate 106 and the lower plate 108 may be substantially parallel to one another.

A slide plate 112 may be positioned or disposed between the top plate 106, the lower plate 108 and sidewalls 110*a* and 110*b*. The slide plate 112 may not be attached, fixed or connected to any of the top plate 106, the lower plate 108 and sidewalls 110*a* and 110*b*, but instead may be in sliding engagement, such that the slide plate 112 may be free to slide between the top plate 106, the lower plate 108 and sidewalls 110*a* and 110*b*, freely, but for friction that may exist between the slide plate 112 and the top plate 106, the lower plate 108 and sidewalls 110*a* and 110*b*. In other embodiments, the slide plate 112 may slide along a track or tracks that may exist on or about any or all of the top plate 106, the lower plate 108 and sidewalls 110*a* and 110*b*. Additionally, any of the slide plate 112, the top plate 106, the lower plate 108 and sidewalls 110*a* and 110*b*, may be coated with or fixed to a material that facilitates and/or improves sliding between the slide plate and the top plate 106, the lower plate 108 and sidewalls 110*a* and 110*b*. The slide plate 112, the top plate 106, the lower plate 108 and sidewalls 110*a* and 110*b*, may be welded together, connected together via fasteners or adhesive, or connected together using any desired mechanism, including being formed, cast or fabricated as a single unitary piece.

The slide plate 112 may be fixed, connected or engaged with a lever 114. The lever 114 may include a handle 116 connected or integrally formed on a first end portion 114*a* of the lever 114. A second end portion 114*b* of the lever 114 may be connected to the slide plate 112. The first end portion 114*a* and the second end portion 114*b* form an obtuse angle such that when the first end portion 114*a* is pushed toward the inner tube 102 the second end portion pushes away from the inner tube 102, and vice versa, as the first end portion 114*a* is pushed or pulled away the inner tube 102 the second end portion 114*b* pushes toward the inner tube 102.

A lever pivot 118 may be formed as a bar or other elongated member that may be supported by pivot support plates 120*a* and 120*b*. The pivot support plates 120*a* and 120*b* may be fixed or attached to the inner tube 102 and the top plate 106, such that the pivot support plates 120*a* and 120*b* may not move independently of the inner tube 102 and the top plate 106. The pivot support plates 120*a* and 120*b* may be substantially parallel to one another and form a space or cavity between the two pivot support plates 120*a* and 120*b*. This space between the pivot support plates 120*a* and 120*b* may be designed and configured to receive the lever 114, such that the lever 114 may pivot within the space between the pivot support plates 120*a* and 120*b*. The lever pivot 118 may be designed and configured to pass through the lever 114 such that the lever may pivot about the lever pivot 118 within the space between the pivot support plates 120*a* and 120*b*.

The second end portion 114*b* of the lever 114 may be connected to the slide plate 112 such that as the second end portion 114*b* of the lever moves away from the inner tube 102, the slide plate 112 may move into alignment with the top plate 106 and the lower plate 108 and as the second end portion 114*b* of the lever 114 moves toward the inner tube 102 at least a portion of the slide plate 112 may move out of alignment with the top plate 106 and the lower plate 108, or out of the space between the top plate 106, the lower plate 108 and sidewalls 110*a* and 110*b*.

A latch 122 may be connected to the handle 116 via a latch pivot 124. The latch pivot 124 enables the latch 122 to move and pivot with respect to the handle 116. A first end portion

122*a* of the latch 122 may be slidably engaged with the handle 116 enabling the latch 122 to stay engaged or connected to the handle 116 as the latch 122 pivots with respect to the handle 116. A second end portion 122*b* of the latch 122 may include a pawl 126 or tooth that can engage a recess 128 on a top portion of the pivot support plate 120*a*. The pawl 126 is designed and configured to engage with the recess 128 such that, when engaged, the recess 128 prevents the latch 122 from moving away from the inner tube 102. When the latch 122 is prevented from moving away from the inner tube 102, so is the corresponding handle 116 and lever 114.

A spring or biasing element 130 may be connected to the second end portion 122*b* of the latch 122 and the handle 116, such that the second end portion 122*b* of the latch 122 is biased downward, and more specifically, biased into engagement between the pawl 126 and the recess 128. This configuration enable the pawl 126 to be biased into a "locked" engagement with the recess 128 at rest. When a user pulls the first end portion of the latch away from the inner tube 102, the pawl 126 may move upward and away from the recess 128 and into an "unlocked" engagement.

The pivot support plate 120*a* may also include a sloped portion 132 which provides a sloped or slanted ramp leading to the recess 128. The sloped portion 132 can gradually push the pawl 126 upward as the handle 116 and latch 122 are pushed toward the inner tube 102 and into a locked position or closed position, and then the pawl 126 will slide over and into the recess 128 when the handle 116 and latch 122 are in the locked position or closed position. Once in the locked position or closed position, the handle 116 and lever 114 will be unable to move until the latch 122 is moved and the pawl 126 is disengaged and unlocked from engagement with the recess 128.

Figure 3:
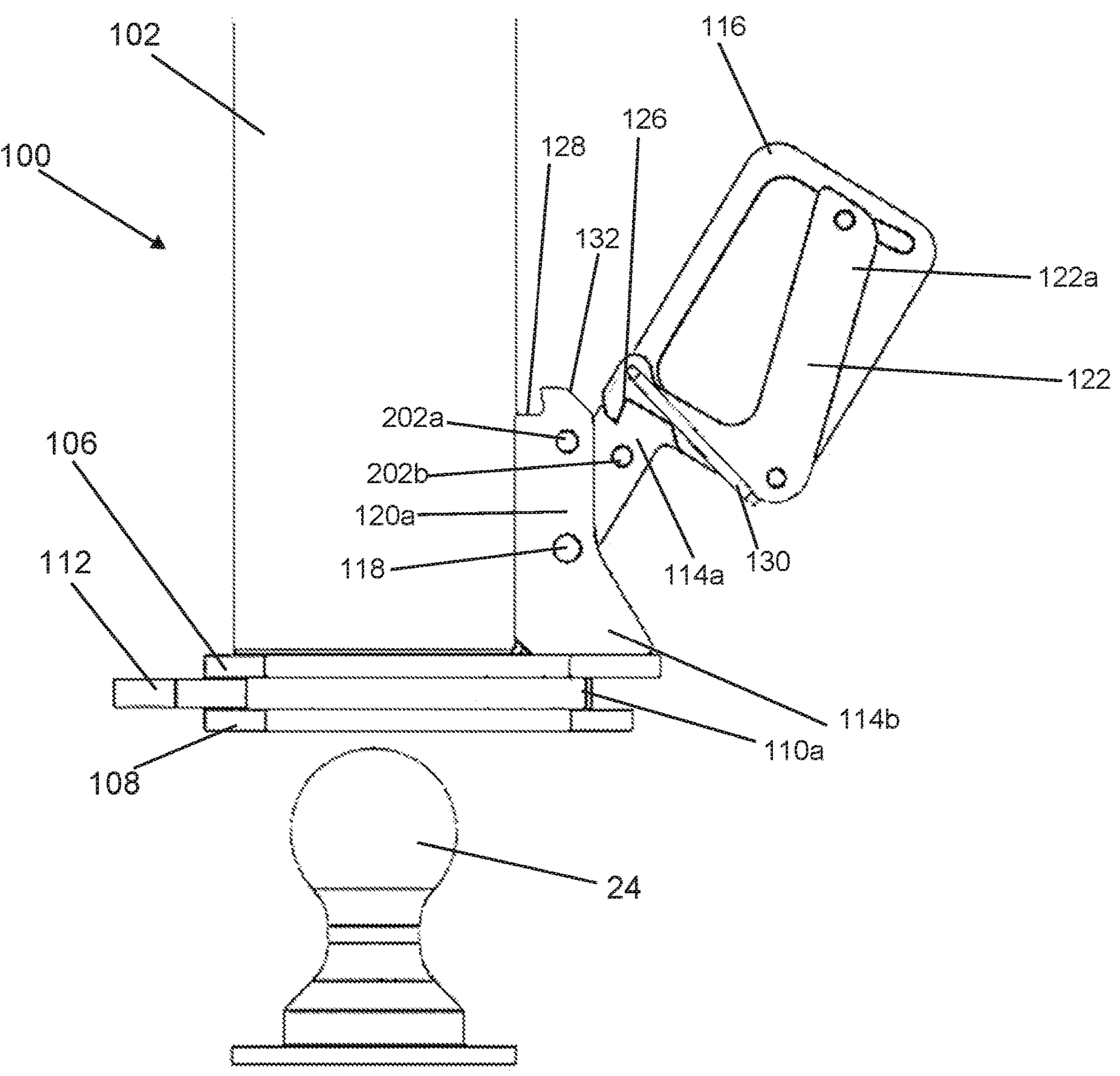
FIG. 3 is a side view of the trailer hitch system of FIG. 1.
Figure 4:
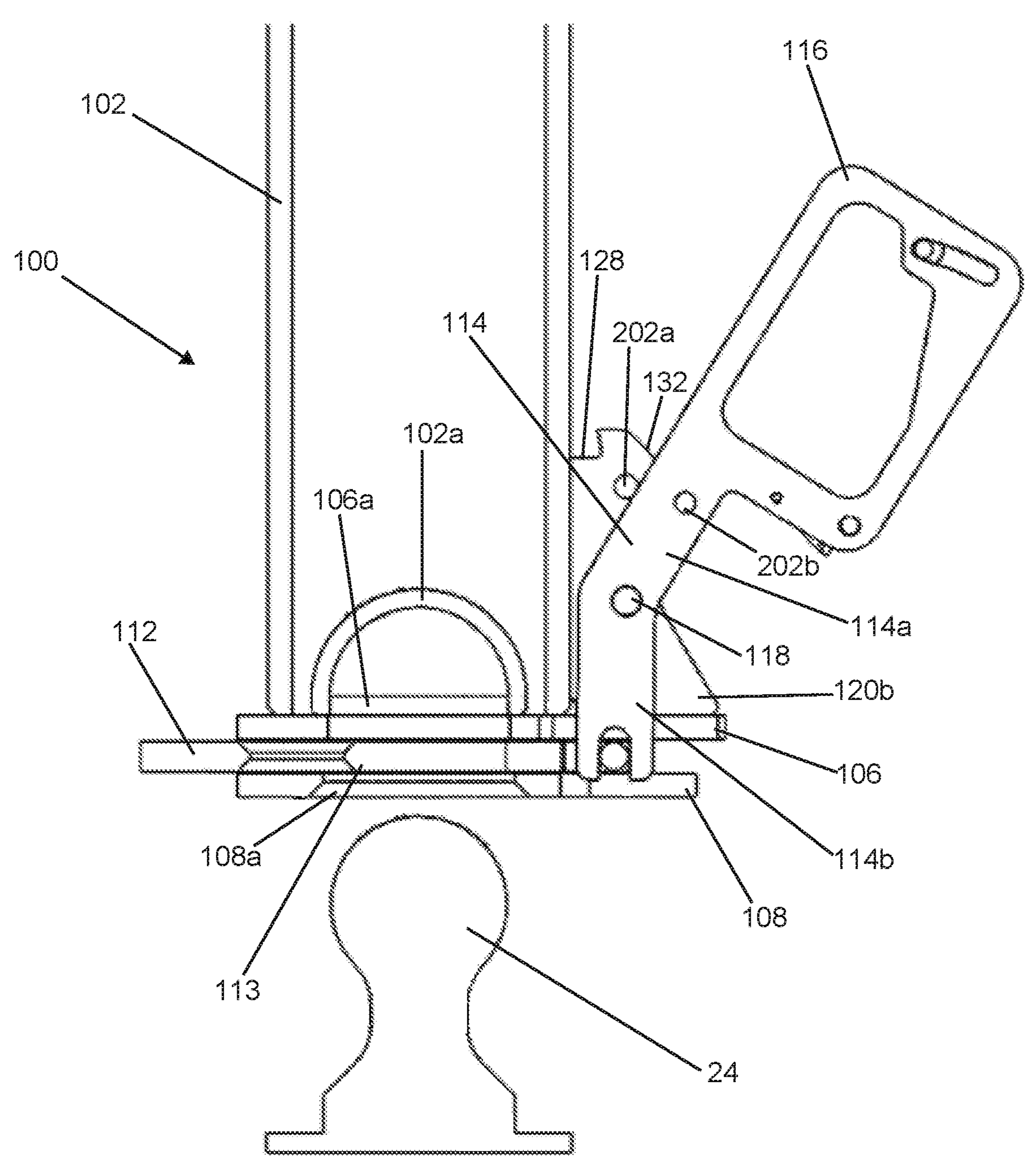
FIG. 4 is a cross-sectional side view of the trailer hitch system of FIG. 1.
Figure 5:
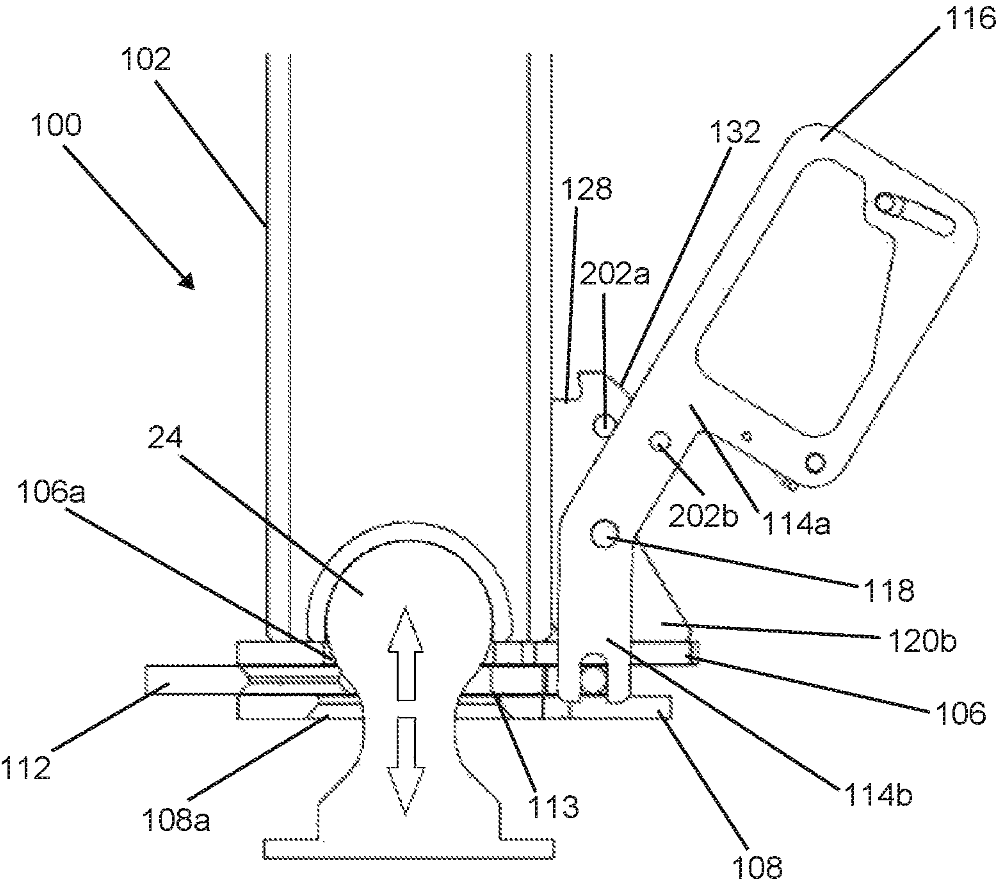
FIG. 5 is a cross-sectional side view of the trailer hitch system of FIG. 1, with a hitch ball coupled to the trailer hitch.
Figure 6:
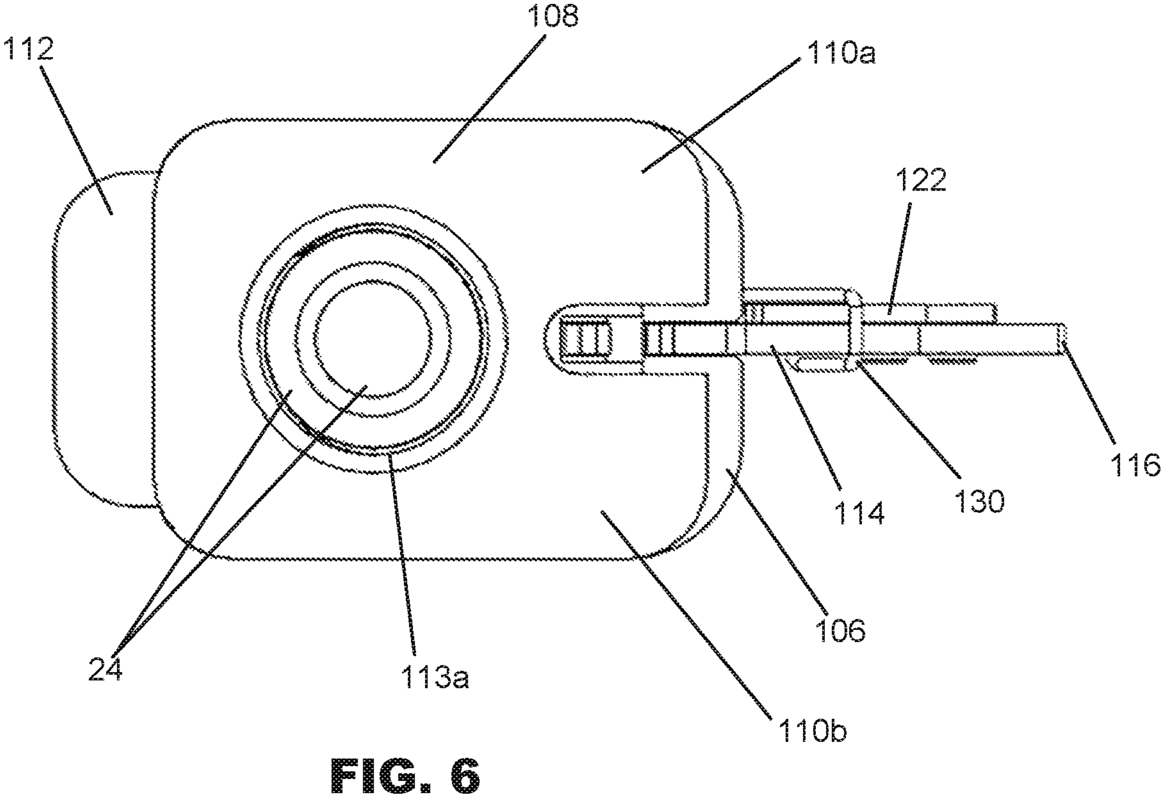
FIG. 6 is a bottom view of the trailer hitch system of FIG. 1, in an open position.

FIGS. 3-5, illustrate the hitch 100 in an open position. FIGS. 3 and 4 illustrate a cross-sectional view of the hitch 100 and hitch ball 24 to better disclose how the hitch ball 24 is received within the hitch 100. Specifically, when the handle 116 is in the open position the slide plate 112 may slide into an open position which can open access to the ball socket 102*a* within the inner tube 102, such that the hitch ball 24 may be inserted into the ball socket 102*a*. The top plate 106 may include an opening 106*a* sized large enough to allow passage of the ball hitch 24. Similarly, the lower plate 108 also includes an opening large enough to allow passage of the ball hitch 24. The slide plate 112 also includes an opening 113 having a first opening portion 113*a* that is large enough to allow passage of the ball hitch 24 when the slide plate is moved into the open position. FIG. 5 illustrates the hitch ball 24 having passed through the top plate opening 106*a*, lower plate opening 108*a* and the slide plate first opening portion 113*a*, while the handle 116 remains in the open position. FIG. 6 also illustrates the hitch ball 24 having passed through the top plate opening 106*a*, lower plate opening 108*a* and the slide plate opening 113, while the handle 116 remains in the open position, but from a bottom view.

Figure 7:
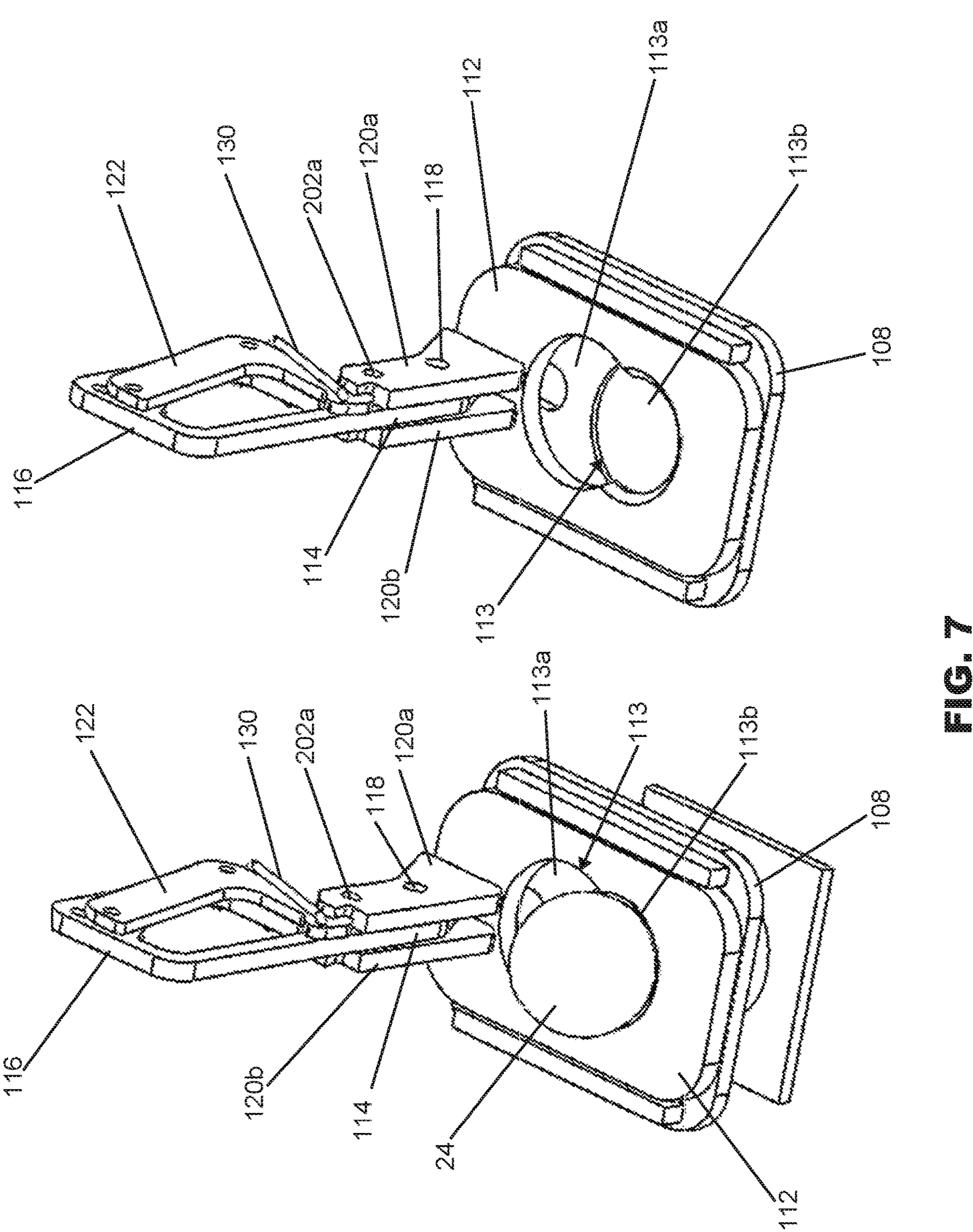
FIG. 7 is a perspective partially assembly view of the trailer hitch system of FIG. 1, in an closed position.
Figure 8:
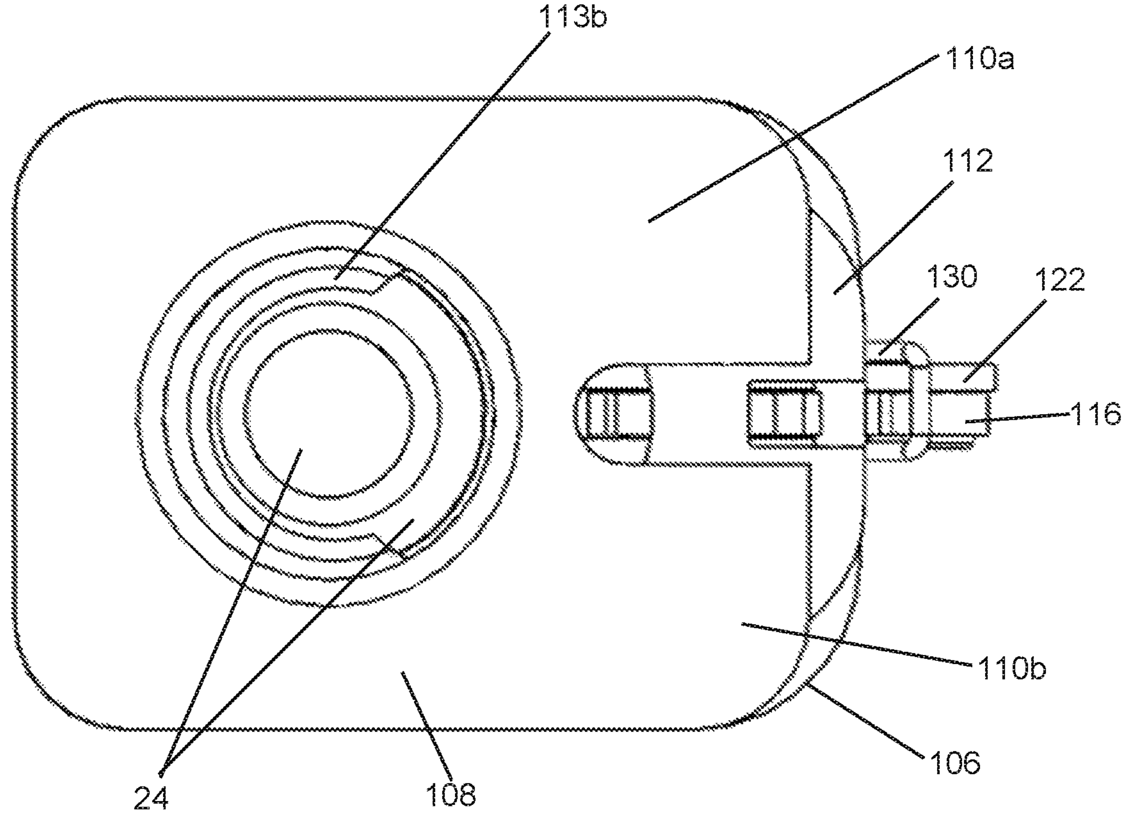
FIG. 8 is a bottom view of the trailer hitch system of FIG. 1, in an closed or locked position.

FIGS. 7 and 8 illustrate the hitch ball 24 having passed through the top plate opening 106*a*, lower plate opening 108*a* and the slide plate opening 113, with the handle 116 in a closed position or locked position. In a closed position, the slide plate 112 moved back into alignment with the top plate 106 and the lower plate 108. The slide plate 112 includes a second opening portion 113*b* having a narrower diameter than the first opening portion 113*a*. The first portion 113*a* of the opening 113 and the second portion 113*b* of the opening 113 may be connected such that the opening 113 is continuous and may allow at least a portion of the hitch ball 24 to move laterally from the first portion 113*a* of the opening 113 to the second portion 113*b* of the opening 113 without removing or disengaging the hitch ball 24 from the opening 113.

When in the closed or locked position, the slide plate 112 aligns with the top plate 106 and the lower plate 108, such that the second portion 113*b* of the opening 113 surrounds the hitch ball 24. The diameter of the hitch ball 24 is greater than the diameter of the second portion 113*b* of the opening 113, so the hitch ball is locked in engagement with the ball socket 102*a* and cannot be disengaged with the ball socket 102*a* until the slide plate 112 is slid into the open position and the first portion 113*a* of the opening 113 surrounds the hitch ball 24. The first portion 113*a* of the opening 113 is larger than the diameter of the hitch ball 24, enabling the hitch ball to be disengaged and removed from the ball socket 102*a*.

The second portion 113*b* of the opening may surround the hitch ball 24 by 180 degrees or more. This means that the second portion 113*b* of the opening 113 may contact the hitch ball 24 on 180 degrees around the surface of the hitch ball 24, if the hitch ball 24 is attempted to be pulled away from the ball socket 102*a*, and may prevent the hitch ball 24 from passing through the opening 113. The 180 degrees or more of contact between the hitch ball 24 and the second portion 113*b* of the opening 113 may also include: more than 40 degrees of contact between the hitch ball 24 and the second portion 113*b* of the opening 113, more than 50 degrees of contact between the hitch ball 24 and the second portion 113*b* of the opening 113, more than 70 degrees of contact between the hitch ball 24 and the second portion 113*b* of the opening 113, and more than 90 degrees of contact between the hitch ball 24 and the second portion 113*b* of the opening 113. The 180 degrees or more of contact between the hitch ball 24 and the second portion 113*b* of the opening 113 may equate to three sides of a square shaped hitch ball or any number of sides that may cover or correspond to 180 degrees or more of an outer perimeter surface of a hitch ball 24, although conventional hitch balls are typically spherical or semi-spherical.

The hitch 100 enables a user to move the hitch 100 into an open position with a single pulling motion, pulling the handle 116 away from the inner tube 102. In this context, "single motion" may be defined by, moving the handle 116 in a single imaginary plane in a single continuous motion without stopping or interrupting the motion.

The hitch 100 also enables a user to move the hitch 100 into a closed position or locked position with a single pushing motion, pushing the handle 116 toward the inner tube 102.

Figure 9:
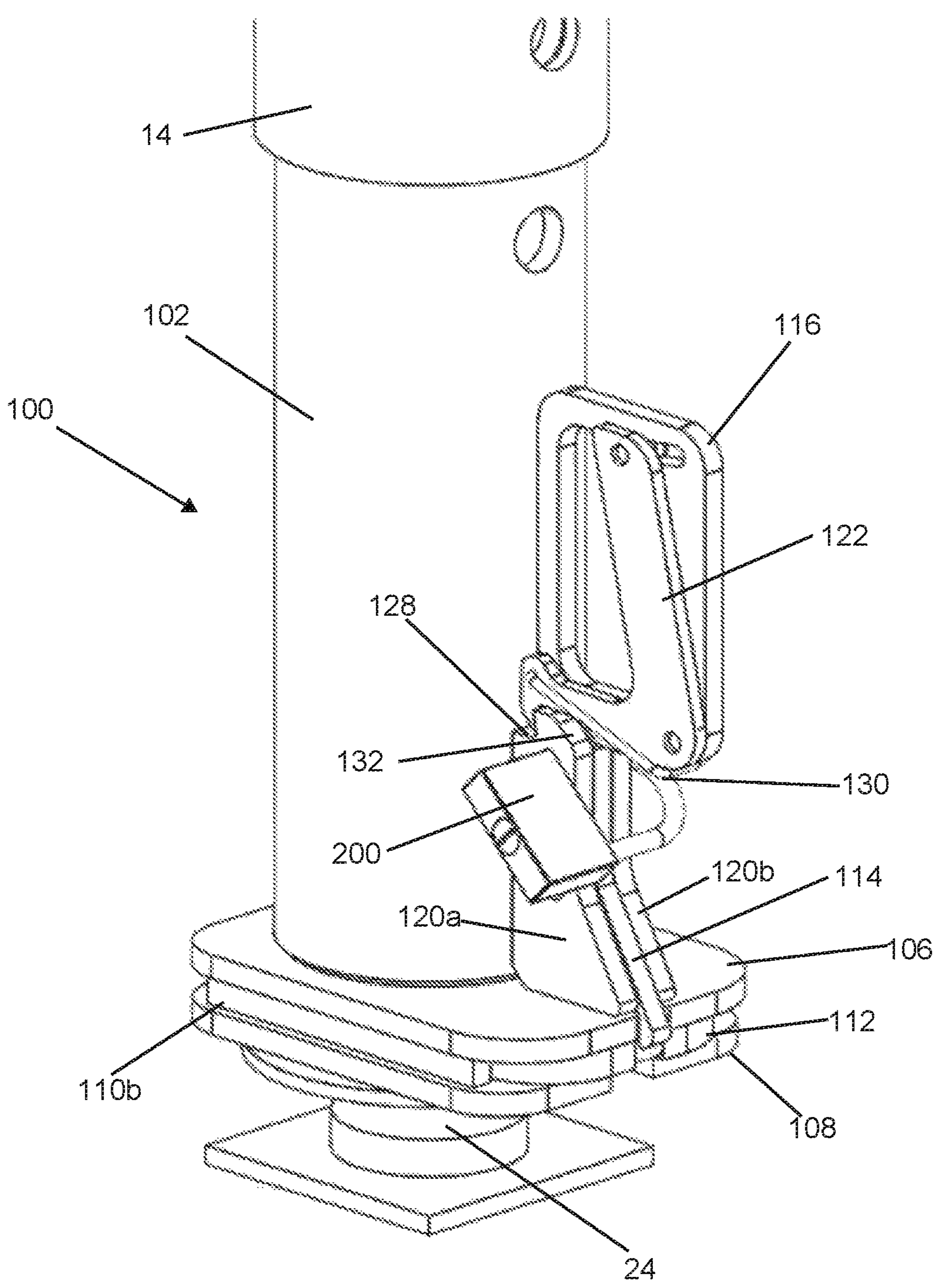
FIG. 9 is a perspective view another trailer hitch system, in accordance with the principles of the present disclosure.

Shown in FIG. 9, another feature of the disclosed embodiment is a locking device 200 that may be coupled to the pivot support plates 120*a* and 120*b* and lever 114. The locking device 200 may extend through at least one outer lock hole 202*a* that may extend through at least one of the pivot support plates 120*a* and 120*b* and the locking device may also extend through at least one inner lock hole 202*b* that may extend through lever 114, when in a locked position. Alternatively, the locking device 200 may extend through corresponding holes (not shown) in the top plate 106, the lower plate 108, or sidewalls 110*a* and 110*b*, in any desired configuration that may prevent the lever 114 from moving from a closed to an open position, or from an open position to a closed position. The locking device 200 may then prevent the handle 116 from moving into an open position, thereby locking the hitch 100 in engagement with the hitch ball 24 such that hitch ball may not be disengaged from the hitch 100 until the locking device is removed from the pivot support plates 120*a* and 120*b* and lever 114. The locking device 200 may be a pad lock, having a combination or a key, or any other type of desired lock capable of passing through the lock hole 202.

Figure 10:
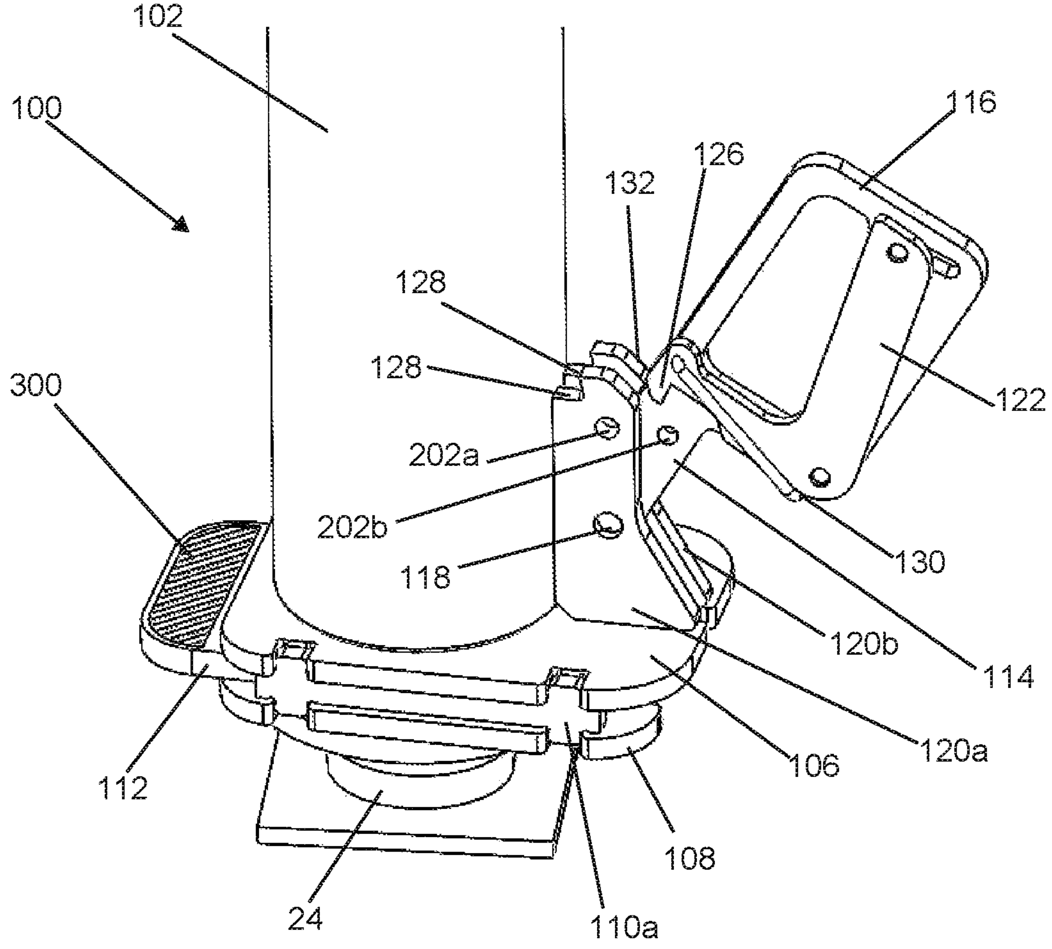
FIG. 10 is a perspective view another trailer hitch system in an open position, in accordance with the principles of the present disclosure.
Figure 11:
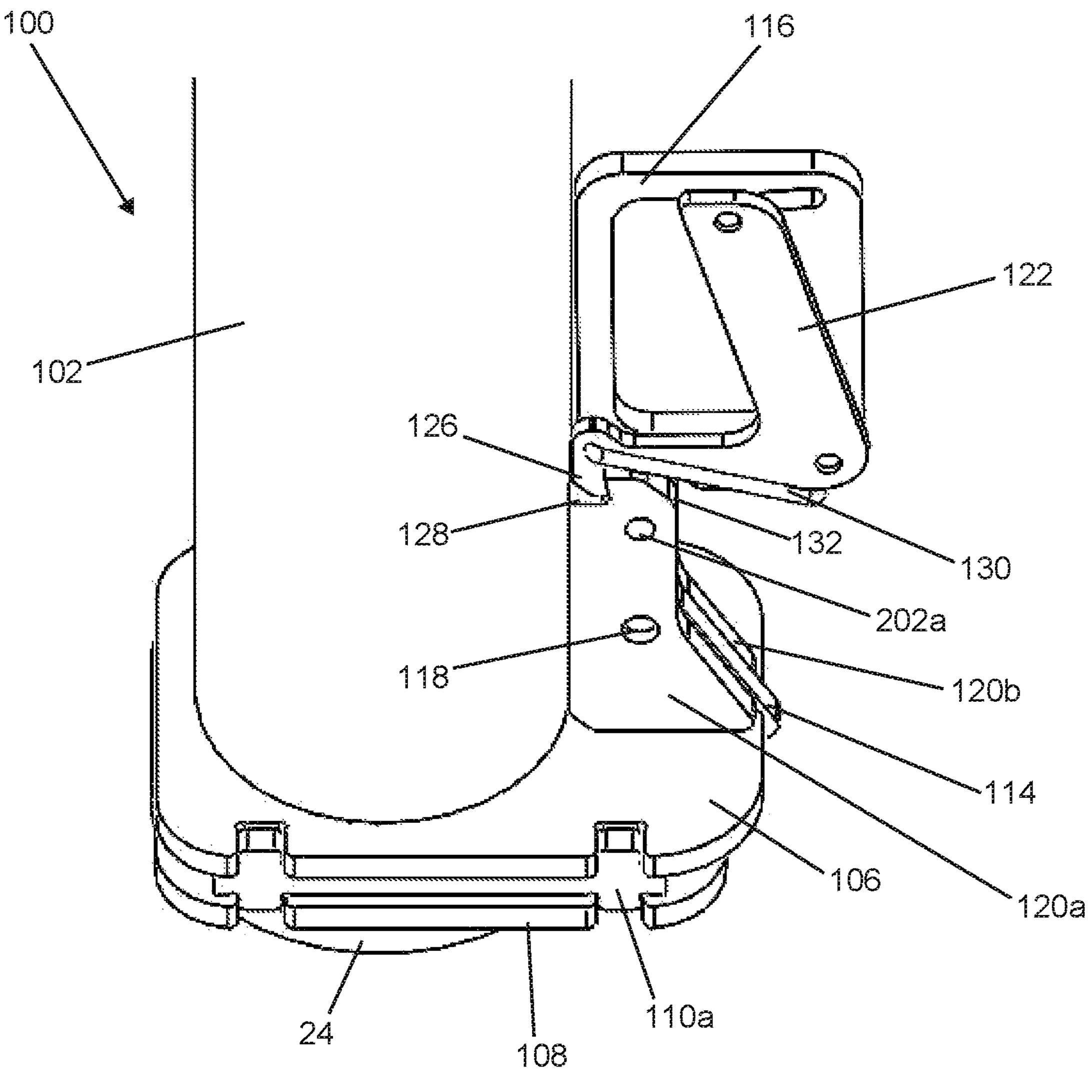
FIG. 11 is a perspective view of the trailer hitch system of FIG. 10, in a closed position.
Figure 12:
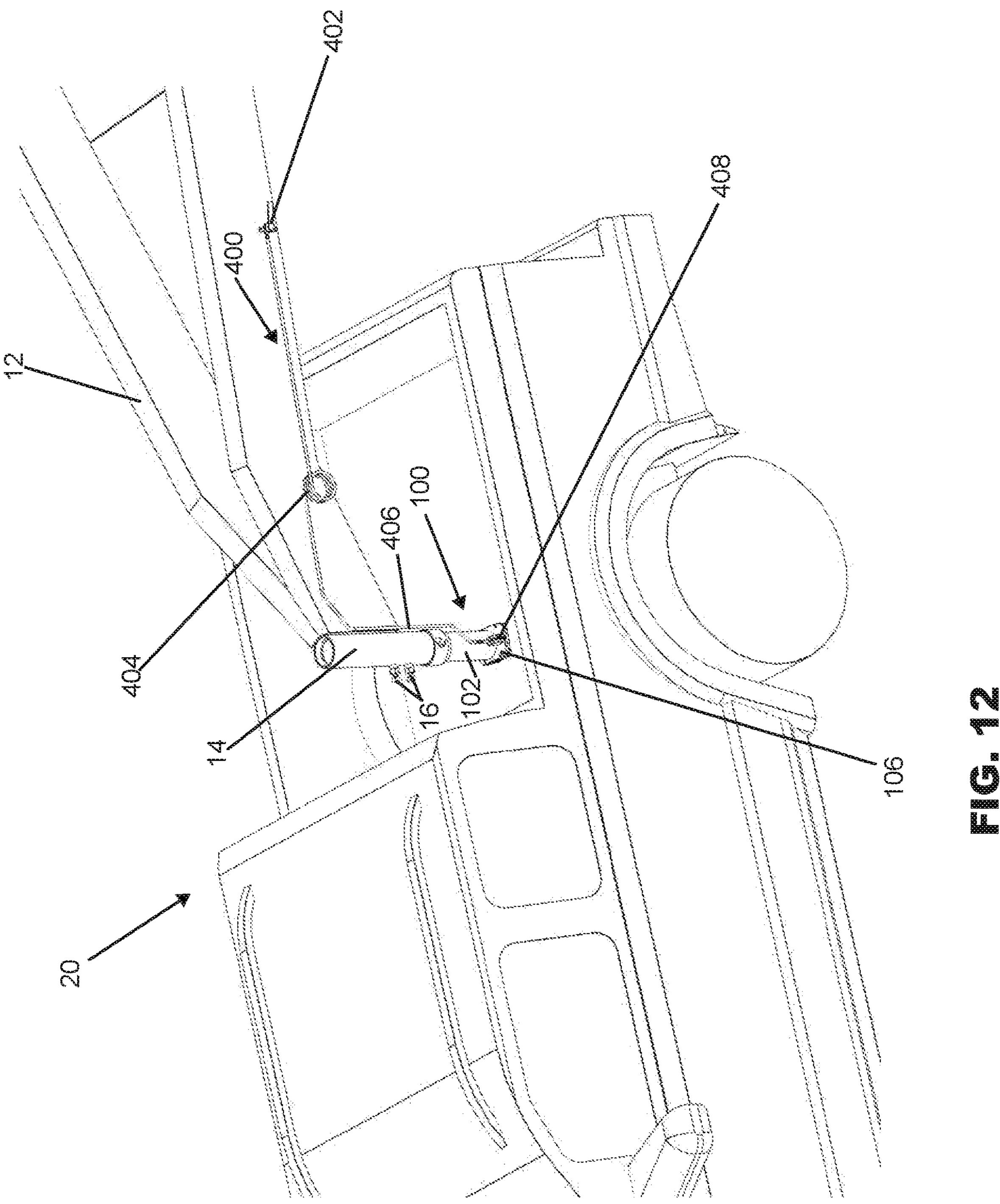
FIG. 12 is a perspective view another trailer hitch system, in accordance with the principles of the present disclosure.
Figure 13:
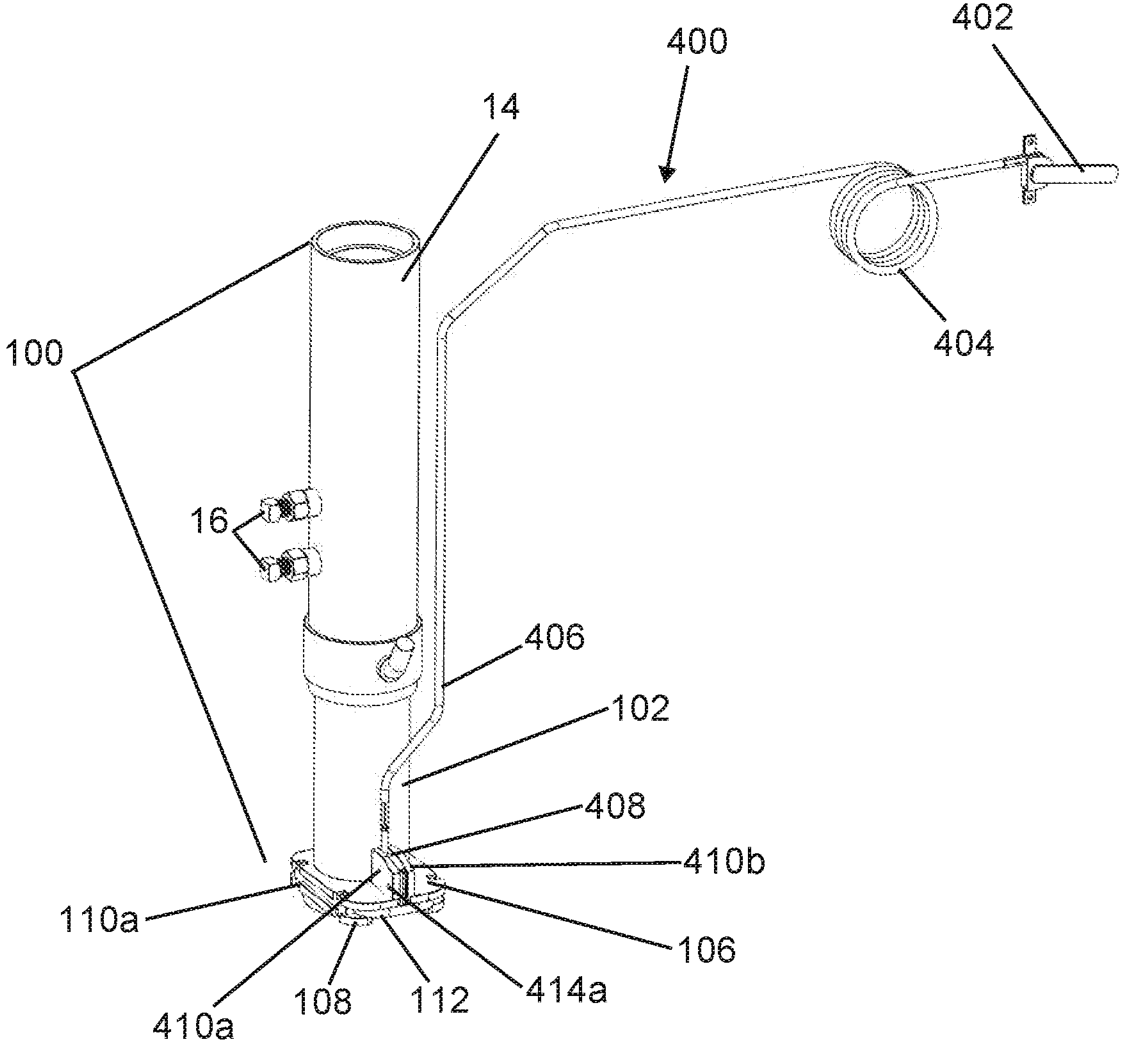
FIG. 13 is a perspective view of the trailer hitch system of FIG. 12.
Figure 14:
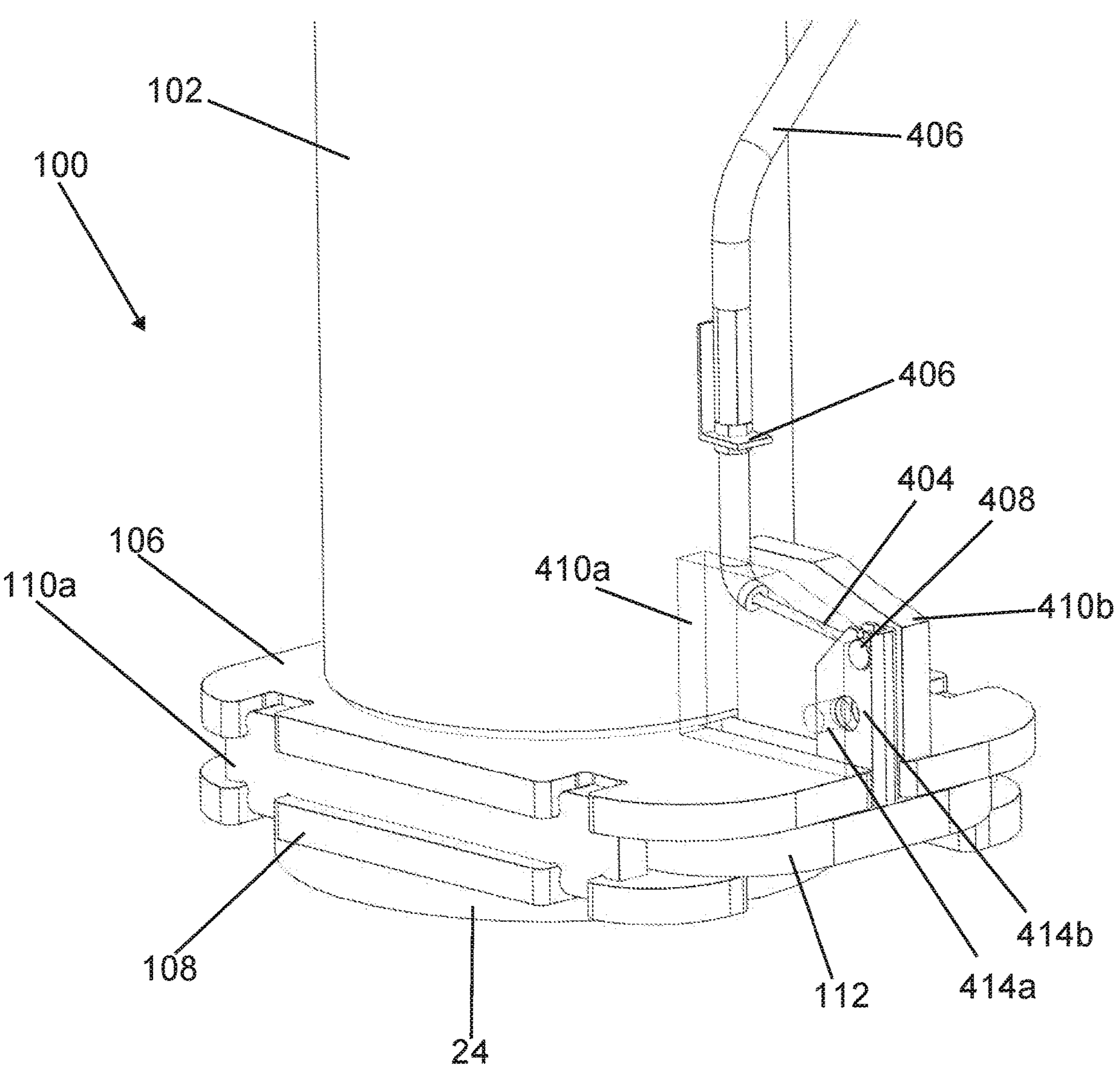
FIG. 14 is a zoomed in perspective view of the trailer hitch system of FIG. 12, in a closed position.
Figure 15:
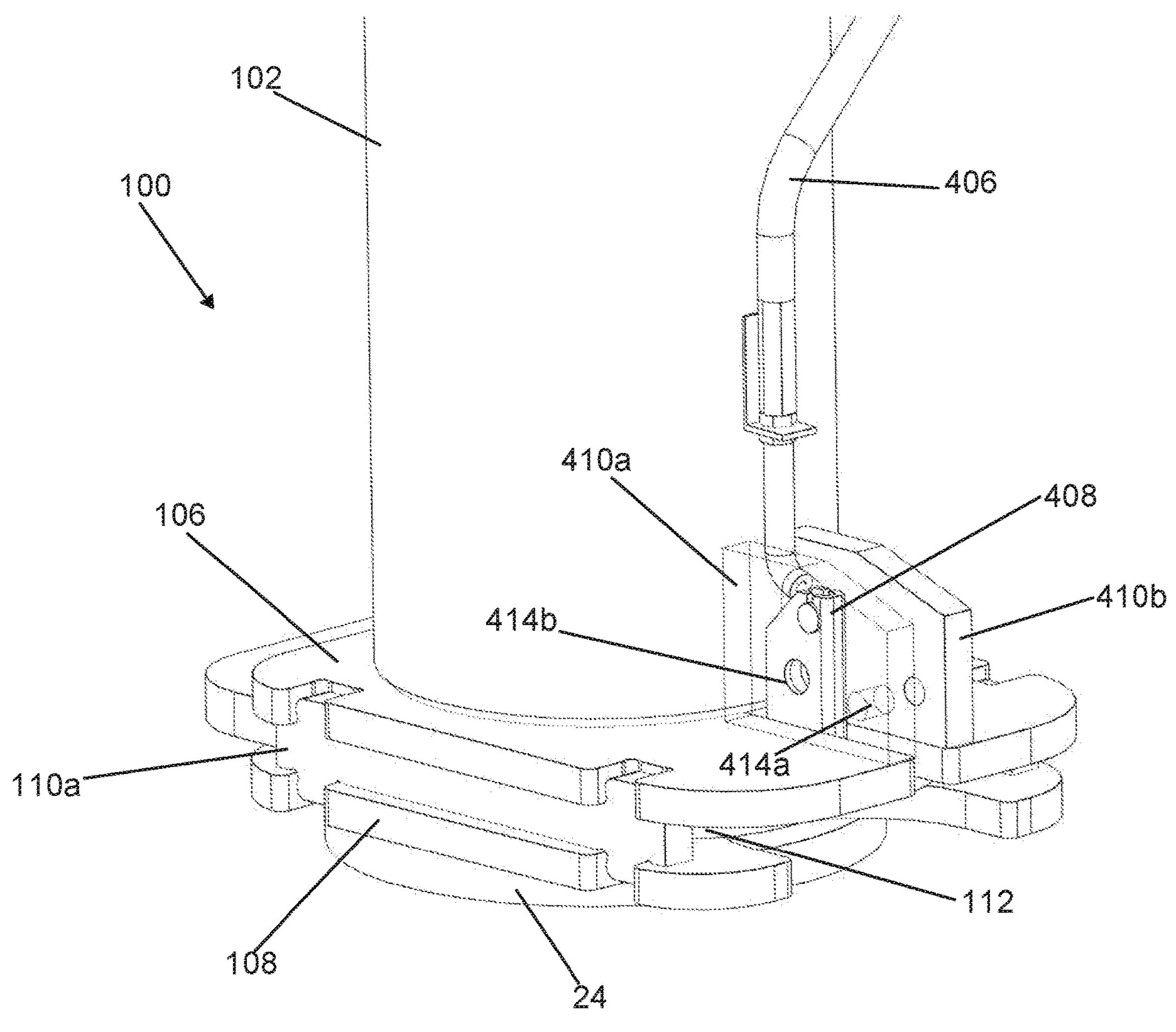
FIG. 15 is a zoomed in perspective view of the trailer hitch system of FIG. 12, in an open position.

Referring to FIGS. 10 and 11, in another embodiment the slide plate 112 may include a visual indicator 300 which may be attached, fixed or integrally formed with a top surface of the slide plate 112 on an end portion of the slide plate 112, such that when the slide plate 112 is in an open position, the visual indicator 300 may be visible to a user. The visual indicator may include, for example, reflective tape or paint, a bright colored sticker or paint, or a textured surface that may visibly stand out to the user. The visual indicator 300 may be used as a warning, safety, or indicator to a user that the hitch is in an open position so the hitch ball 24 will not be locked into engagement with the hitch 100. FIG. 11 illustrates when the slide plate 112 is in a locked position, so the slide plate is in alignment with the top plate 106 and the lower plate 108, such that the visual indicator 300 is no longer visible to a user. When the visual indicator 300 is not visible, the user knows that the hitch ball 24 is locked into engagement with the hitch 100.

FIGS. 12-15 disclose another embodiment of the current disclosure. In this embodiment the same basic components of the hitch 100 are the same as the other embodiments disclosed above, however, the handle 116, lever 114 and pivot support plates 120*a* and 120*b* are removed and substituted with a remote cable system 400. The remote cable system 400 may include a latch actuator 402 that may be attached or connected to the trailer 10 at a location that may be readily accessible to a user from behind the tow vehicle 20. This attachment location may include a location on the trailer arm 12.

The latch actuator 402 may be connected to a cable 404 that may run along the trailer arm 12 and down the hitch 100. The cable 404 may be fed through and supported by a cable sleeve 406, which can be fixed or fastened to the trailer arm 12 and the outer tube 14 and the inner tube 102 as a means of maintaining a secured position of the cable during use.

The cable 404 may then be connected to a connector plate 408 and the connector plate 408 may be secured or fixed to the slide plate 112, such that as the connector plate is pushed away from the inner tube 102 the slide plate 112 will move into a locked position, and as the connector plate is pulled toward the inner tube 102, the slide plate 112 will be moved into an open position.

The connector plate 408 may be designed and configured to slide back and forth between an open position or unlocked position and a closed position or locked position through a slot formed between connector support plates 410*a* and 410*b*. The connector support plates and 410*a* and 410*b* may be substantially parallel to each other and provide a slot there between which can act as a guide or track for the connector plate 408 to move from an open position to a closed position, and vice versa. This cable system 400 may enable a user to operate the hitch 100 and easily lock or unlock the hitch 100 from a location behind the tow vehicle and significantly removed from the actual hitch 100 components. The user can actuate the latch actuator 402 which moves the cable 404 to then move the connector plate 408 from the open position to the closed position and vice versa.

The connector support plates 410*a* and 410*b* may also include at least one outer locking hole 414*a* and connector plate 408 may include at least one inner locking hole 414*b*. The locking device 200 (not shown in FIGS. 12-15) may extend through the at least one outer lock hole 414*a* and through the at least one inner lock hole 414*b*, when in a locked position. The locking device 200 may then prevent the connector plate 408 from moving into an open position, thereby locking the hitch 100 in engagement with the hitch ball 24 such that hitch ball may not be disengaged from the hitch 100 until the locking device 200 is removed from the support plates 410*a* and 410*b* and connector plate 408, or prevent the hitch ball 24 from being inserted into the hitch 100 if locked prior to engagement between the hitch ball 24 and the hitch 100. As disclosed above, locking device 200 may be a pad lock, having a combination or a key, or any other type of desired lock capable of passing through the outer lock hole 414*a* and inner lock hole 414*b*.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A trailer hitch comprising:

a tube having a ball socket;

a top plate connected to the tube, wherein the top plate includes an opening designed and configured to receive a hitch ball;

a lower plate, wherein the lower plate includes an opening designed and configured to receive a hitch ball, and wherein the lower plate is connected to the top plate via first and second sidewalls, and the top plate, lower plate and first and second sidewalls form a space; and a slide plate positioned within the space and configured to slide between the top plate and the lower plate, wherein the slide plate includes an opening designed and configured to receive a hitch ball, wherein the opening of the slide plate includes a first portion of the opening that allows the hitch ball to pass through the opening, and a second portion of the opening that does not allow the hitch ball to pass through the opening;

wherein the slide plate is configured to move between an open position and a closed position, wherein the open position enables a hitch ball to pass through the first portion of the opening of the slide plate and the closed position prevents a hitch ball from passing through the second portion of the opening in the slide plate.

2. The trailer hitch of claim 1, further comprising:

a handle; and a lever, wherein the lever has a first end portion connected to the handle and a second end portion engaged with the slide plate;

wherein the handle is configured to move from an open position, that moves the slide plate to an open position, to a closed position, that moves the slide plate to a closed position.

3. The trailer hitch of claim 2, wherein the lever pivots about a lever pivot.

4. The trailer hitch of claim 2, wherein the handle is configured to move from the closed position to the open position using a single motion.

5. The trailer hitch of claim 1, wherein the slide plate includes a visual indicator when in the open position.

6. The trailer hitch of claim 5, wherein the visual indicator is not visible to a user when the slide plate is in the closed position.

7. The trailer hitch of claim 1, further comprising:

a cable actuator connected to a cable; and a connector plate connected to the cable and the slide plate;

wherein the connector plate is configured to move from an open position, that moves the slide plate to the open position, to a closed position, that moves the slide plate to the closed position; and wherein the cable actuator is configured to move the connector plate from the open position to the closed position.

8. The trailer hitch of claim 1, wherein the second portion of the opening of the slide plate is configured to contact the hitch ball on more than 180 degrees around the hitch ball.

9. A method of coupling a trailer hitch to a hitch ball, comprising:

providing the hitch ball;

providing the trailer hitch, the hitch including:

a tube having a ball socket;

a top plate connected to the tube, wherein the top plate includes an opening designed and configured to receive the hitch ball;

a lower plate, wherein the lower plate includes an opening designed and configured to receive the hitch ball, and wherein the lower plate is connected to the top plate via first and second sidewalls, and the top plate, lower plate and first and second sidewalls form a space and a slide plate positioned within the space and configured to slide between the top plate and the lower plate, wherein the slide plate includes an opening designed and configured to receive the hitch ball, wherein the opening of the slide plate includes a first portion of the opening that allows the hitch ball to pass through the opening, and a second portion of the opening that does not allow the hitch ball to pass through the opening;

wherein the slide plate is configured to move between an open position and a closed position, wherein the open position enables the hitch ball to pass through the opening of the slide plate and the closed position prevents the hitch ball from passing through the opening in the slide plate;

moving the slide plate to the open position;

inserting the hitch ball into the ball socket; and moving the slide plate to the closed position.

10. The method of claim 9, wherein the trailer hitch further includes:

a handle; and a lever, wherein the lever has a first end portion connected to the handle and a second end portion connected to the slide plate;

wherein the handle is configured to move from an open position, that moves the slide plate to the open position, to a closed position, that moves the slide plate to the closed position.

11. The method of claim 10, wherein the lever pivots about a lever pivot.

12. The method of claim 10, further comprising:

moving the handle from the closed position to the open position using a single motion.

13. The method of claim 9, wherein the slide plate includes a visual indicator when in the open position.

14. The method of claim 13, wherein the visual indicator is not visible to a user when the slide plate is in the closed position.

15. The method of claim 9, wherein the trailer hitch further includes:

a cable actuator connected to a cable; and a connector plate connected to the cable and the slide plate;

wherein the connector plate is configured to move from the open position, that moves the slide plate to the open position, to the closed position, that moves the slide plate to the closed position; and wherein the cable actuator is configured to move the connector plate from the open position to the closed position.

16. The method of claim 9, wherein the second portion of the opening of the slide plate is configured to contact the hitch ball on more than 180 degrees around the hitch ball.

17. The method of claim 10, further comprising:

locking the handle using a locking mechanism, preventing the handle from moving to the open position.

18. A trailer hitch comprising:

a tube having a ball socket;

a top plate connected to the tube, wherein the top plate includes an opening designed and configured to receive a hitch ball;

a lower plate, wherein the lower plate includes an opening designed and configured to receive a hitch ball, and wherein the lower plate is connected to the top plate via first and second sidewalls, and the top plate, lower plate and first and second sidewalls form a space;

a slide plate positioned within the space and configured to slide between the top plate and the lower plate, wherein the slide plate includes an opening designed and configured to receive the hitch ball;

wherein the slide plate is configured to move between an open position and a closed position, wherein the open position enables the hitch ball to pass through the opening of the slide plate and the closed position prevents the hitch ball from passing through the opening in the slide plate, and wherein the slide plate includes a visual indicator when in the open position and wherein the visual indicator is not visible to a user when the slide plate is in the closed position;

a handle; and a lever, wherein the lever has a first end portion connected to the handle and a second end portion connected to the slide plate, wherein the lever pivots about a lever pivot;

wherein the handle is configured to move from the open position, that moves the slide plate to the open position, to the closed position, that moves the slide plate to the closed position;

wherein the handle is configured to move from the closed position to the open position using a single motion; and wherein the opening of the slide plate includes a first portion of the opening that allows the hitch ball to pass through the opening, and a second portion of the opening that does not allow a hitch ball to pass through the opening, and the second portion of the opening of the slide plate is configured to contact the hitch ball on more than 180 degrees around the hitch ball.

19. The trailer hitch of claim 18, wherein the second portion of the opening of the slide plate is configured to contact the hitch ball on more than 40 degrees around the hitch ball.

* * * * *